J. HUGHES.
Dumping Cars.
No. 142,021. Patented August 19, 1873.
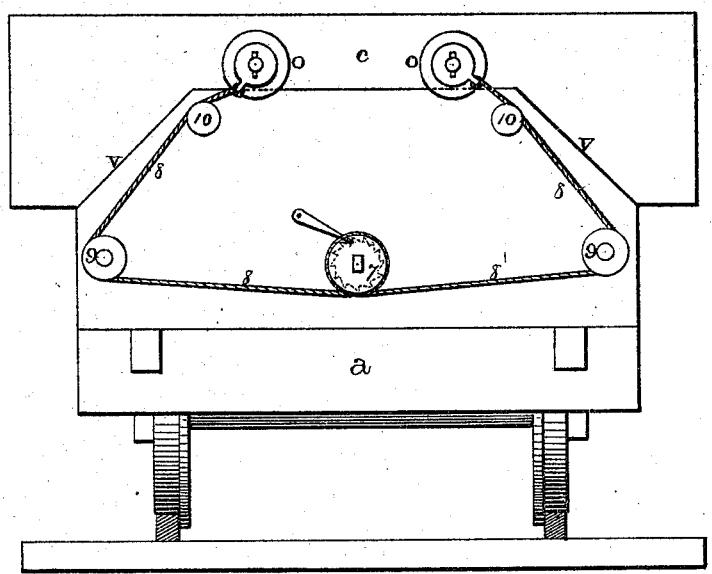
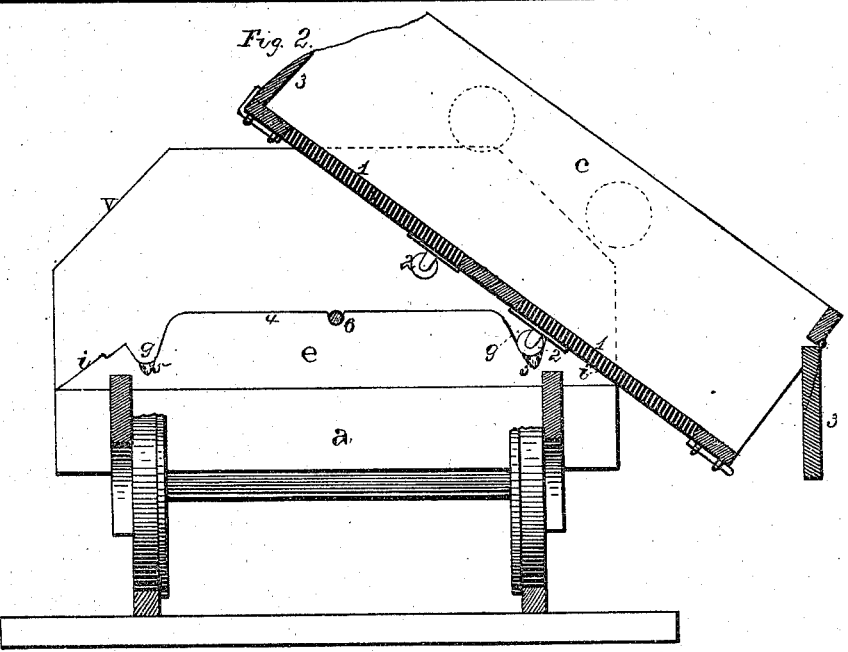
WITNESSES.
INVENTOR.

UNITED STATES PATENT OFFICE.

JOHN HUGHES, OF NEW BERNE, NORTH CAROLINA.

IMPROVEMENT IN DUMPING-CARS.

Specification forming part of Letters Patent No. 142,021, dated August 19, 1873; application filed August 9, 1873.

*To all whom it may concern:*

Be it known that I, JNO. HUGHES, of New Berne, in the county of Craven and State of North Carolina, have invented certain new and useful Improvements in Dumping-Cars; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in dumping-cars; and it consists in, first, the arrangement of the cord and pulleys at each end of the car, whereby it is moved from side to side upon the truck, so as to dump its load automatically upon either side of the track; second, the ways formed upon the inner ends of the truck, having recesses formed in their tops, in which the friction-rollers secured to the bottom of the car catch, and having inclined planes upon their ends, upon which inclines the body of the car rests, so as to prevent the body from upsetting while dumping its load, and to hold it steady and firm in this position; third, the arrangement and combination of parts, which will be more fully described hereafter.

The accompanying drawings represent my invention.

*a* represents an ordinary car-truck, upon which the body *c* moves back and forth, so as to dump its load beyond the track, on either side. Upon the inner side of each end of the truck is secured a way, *e*, having the horizontal part 4, inclined planes *i* upon its ends, and the recesses *g* formed in its upper edge. Secured to the under side of the body *c*, there are two small friction-rollers, 2, at each end, which move back and forth on the top of the ways, and which steady and support the body in its movement. As the body is moved toward either side, the outer pulleys run down into the recesses *g* and cause the body to tilt downward, as shown in Fig. 2, and automatically dump its load through the side doors 3, the outer edge of the body resting upon the inclined planes *i*, so as to prevent it from tilting too far. The body is also provided with downwardly-opening doors 1, through which the load can be deposited upon the track if so desired. The bottoms of the recesses *g* are cut away, as shown at 5, so that no dirt can find a lodging-place in them, and clog the wheels 2. Extending through from end to end of the truck is the operating-shaft 6, having a pulley, 7, and a pawl and ratchet at each end. Around this pulley a cord or chain, 8, is wrapped one or more times, and then passed up around the pulleys 9 10 and secured to the grooved rollers *o* on the end of the body *c*, the pulleys being so arranged that the pull from the cord or chain will be as direct as possible upon the body. The ends of the cord, being attached to the opposite sides of the car, serve not only to arrest further motion after it has moved far enough, but it draws the car so gradually along as to prevent that sudden downward jerk which usually accompanies the dumping. It also serves to prevent the car-body from upsetting, arrests any vertical movement, and restores the body to a horizontal position after having been dumped. Either both set, 9 10, may be used together, or the upper ones, 10, may be dispensed with, and the lower ones, 9, used alone. The upper edge of the truck-head is rounded off so as to form ways, upon which the grooved rollers *o* travel, supporting the weight of the car, and which have their ends cut away, so as to form inclined planes *v*. A crank being applied to either end of the operating-shaft, the body is caused to move toward either side desired until the rollers 2 reach the recesses *g*, and the rollers *o* the inclined planes *v*, when, the pivotal point being passed, the force of gravity at once causes the body to tilt downward and automatically dump its load.

Having thus described my invention, I claim—

1. The ways *e*, having the horizontal plane 4, recesses *g*, and inclined planes *i*, substantially as set forth.

2. The combination of the ways *e*, having the recesses *g* and inclined planes *v*, arranged relatively to each other substantially as shown.

3. The combination of the shaft 6, pulleys 7, cord 8, and pulleys 9, and rollers o, substantially as specified.

4. The truck a, having the inclined planes v formed upon its ends, recessed and beveled ways e, body c, provided with rollers o 2, shaft 6, pulleys 7 9, and cord or chain 8, substantially as shown and described.

In testimony that I claim the foregoing I have hereunto set my hand this 8th day of August, 1873.

JNO. HUGHES.

Witnesses:
   H. H. BURTON,
   THOMAS C. CONNOLLY.